United States Patent
Cui et al.

(10) Patent No.: US 8,995,531 B2
(45) Date of Patent: Mar. 31, 2015

(54) REPRESENTATIVE MOTION FLOW EXTRACTION FOR EFFECTIVE VIDEO CLASSIFICATION AND RETRIEVAL

(75) Inventors: Bin Cui, Beijing (CN); Zhe Zhao, Beijing (CN)

(73) Assignee: Peking University, Beijing (CN)

( * ) Notice: Subject to any disclaimer, the term of this patent is extended or adjusted under 35 U.S.C. 154(b) by 436 days.

(21) Appl. No.: 13/257,791

(22) PCT Filed: Aug. 2, 2010

(86) PCT No.: PCT/CN2010/075631
§ 371 (c)(1),
(2), (4) Date: Sep. 20, 2011

(87) PCT Pub. No.: WO2012/016370
PCT Pub. Date: Feb. 9, 2012

(65) Prior Publication Data
US 2012/0275521 A1    Nov. 1, 2012

(51) Int. Cl.
| H04N 7/32 | (2006.01) |
| H04N 5/232 | (2006.01) |
| G06T 7/20 | (2006.01) |
| G06F 17/30 | (2006.01) |

(52) U.S. Cl.
CPC .......... H04N 5/23254 (2013.01); G06T 7/2033 (2013.01); G06F 17/30811 (2013.01); *G06T 2207/20021* (2013.01)
USPC .................................................. 375/240.16

(58) Field of Classification Search
CPC ................. H04N 7/32; H04N 5/23254; G06F 17/30811; G06T 7/2033
USPC ..................................................... 375/240.16
See application file for complete search history.

(56) References Cited

U.S. PATENT DOCUMENTS

| 5,392,367 | A  | * | 2/1995 | Hsu et al. ...................... 382/228 |
| 6,643,387 | B1 | * | 11/2003 | Sethuraman et al. ......... 382/107 |
| 2002/0154212 | A1 | * | 10/2002 | Thomas ...................... 348/14.13 |
| 2003/0086496 | A1 | * | 5/2003 | Zhang et al. ............. 375/240.16 |
| 2003/0117611 | A1 | * | 6/2003 | Chon et al. ................... 356/5.01 |
| 2005/0025242 | A1 | * | 2/2005 | Ma et al. .................. 375/240.16 |
| 2006/0008121 | A1 | * | 1/2006 | Zhang et al. .................. 382/107 |
| 2006/0269155 | A1 | * | 11/2006 | Tener et al. ................... 382/243 |

(Continued)

FOREIGN PATENT DOCUMENTS

| CN | 10-1582063 A | 11/2009 |
| EP | 1 494 137 A2 | 1/2005 |

(Continued)

OTHER PUBLICATIONS

Hu, et. al, "Detecting Global Motion Patterns in Complex Videos," ICPR, 2008.*

(Continued)

*Primary Examiner* — Jay Au Patel
*Assistant Examiner* — Joseph Suh
(74) *Attorney, Agent, or Firm* — Hope Baldauff LLC

(57) ABSTRACT

Technologies are generally described herein for extracting a representative motion flow from a video. Technologies are also generally described herein for retrieving a video utilizing the representative motion flow. The representative motion flow may be extracted utilizing a sliding window approach to generate interesting motion flows. The representative motion flow may be generated based on the interesting motion flows.

20 Claims, 10 Drawing Sheets

(56) References Cited

U.S. PATENT DOCUMENTS

| | | | |
|---|---|---|---|
| 2007/0046782 A1* | 3/2007 | Helbing et al. | 348/208.4 |
| 2007/0081705 A1* | 4/2007 | Carneiro et al. | 382/128 |
| 2007/0153900 A1* | 7/2007 | Koto et al. | 375/240.16 |
| 2007/0242748 A1* | 10/2007 | Mahadevan et al. | 375/240.14 |
| 2008/0095239 A1* | 4/2008 | Lim et al. | 375/240.16 |
| 2008/0186487 A1* | 8/2008 | Kormann et al. | 356/328 |
| 2008/0249644 A1* | 10/2008 | Jehan | 700/94 |
| 2008/0252723 A1* | 10/2008 | Park | 348/143 |
| 2008/0273751 A1* | 11/2008 | Yuan et al. | 382/103 |
| 2009/0016609 A1* | 1/2009 | Zakrzewski et al. | 382/190 |
| 2009/0096879 A1* | 4/2009 | Motomura et al. | 348/208.6 |
| 2009/0102953 A1* | 4/2009 | Bornstein et al. | 348/273 |
| 2009/0103888 A1* | 4/2009 | Murabayashi et al. | 386/52 |
| 2009/0132446 A1* | 5/2009 | Milenova et al. | 706/12 |
| 2009/0136091 A1* | 5/2009 | Woodfill et al. | 382/106 |
| 2009/0180032 A1* | 7/2009 | Heng et al. | 348/699 |
| 2009/0180532 A1* | 7/2009 | Zhang et al. | 375/240.01 |
| 2009/0231453 A1* | 9/2009 | Huang | 348/220.1 |
| 2009/0290032 A1* | 11/2009 | Zhang et al. | 348/211.9 |
| 2010/0027844 A1* | 2/2010 | Akita | 382/103 |
| 2010/0104184 A1* | 4/2010 | Bronstein et al. | 382/170 |
| 2010/0104203 A1* | 4/2010 | Garakani et al. | 382/228 |
| 2010/0119171 A1* | 5/2010 | Gobert | 382/255 |
| 2010/0172591 A1* | 7/2010 | Ishikawa | 382/224 |
| 2010/0215104 A1* | 8/2010 | Osamoto et al. | 375/240.16 |
| 2010/0231593 A1* | 9/2010 | Zhou et al. | 345/428 |
| 2010/0296752 A1* | 11/2010 | Pataky et al. | 382/276 |
| 2010/0322314 A1* | 12/2010 | Huang et al. | 375/240.16 |
| 2011/0002852 A1* | 1/2011 | Chopp et al. | 424/9.1 |
| 2011/0150085 A1* | 6/2011 | Andrijanic et al. | 375/240.12 |
| 2011/0205359 A1* | 8/2011 | Lee et al. | 348/143 |
| 2011/0213249 A1* | 9/2011 | Nakata et al. | 600/443 |
| 2012/0232388 A1* | 9/2012 | Curra et al. | 600/438 |
| 2012/0243732 A1* | 9/2012 | Swaminathan et al. | 382/103 |

FOREIGN PATENT DOCUMENTS

| | | |
|---|---|---|
| JP | 2002-223412 A | 8/2002 |
| JP | 2006-217046 A | 8/2006 |

OTHER PUBLICATIONS

International Search Report dated Apr. 28, 2011 in International Application No. PCT/CN2010/075631.

Su et al., "Motion flow-based video retrieval," Oct. 2007, IEEE Transactions on Multimedia, 9 (6):1193-1201.

Thi et al., "Trajectory-based video indexing and retrieval enabling relevance feedback," 2006, 1$^{st}$ International Conference on Communications and Electronics (ICCE'06), Hanoi, Vietnam, 6 pages.

Wang et al., "Video event detection using motion relativity and visual relatedness," 2008, Proceedings of the 16$^{th}$ ACM International Conference on Multimedia (MM '08), 239-248.

Yilmaz et al., "Object tracking: A Survey," 2006, ACM Computing Surveys (CSUR), 38(4): Article No. 13, 45 pages.

Le, T-L et al., "Subtrajectory-Based Video Indexing and Retrieval," Advances in Multimedia Modeling Lecture Notes in Computer Science, vol. 4351, pp. 418-427 (2006).

Bashir, Faisal I., etc., "Real-Time Motion Trajectory-Based Indexing and Retrieval of Video Sequences", IEEE Transactions on Multimedia, vol. 9, No. 1, Jan. 2007, pp. 1-11.

Chen, Lei and Oria, Vincent "Symbolic Representation and Retrieval of Moving Object Trajectories", Proceedings of the 6th ACM SIGMM International Workshop on Multimedia Information Retrieval, pp. 227-234 (2004).

* cited by examiner

704A AT LEAST ONE OF
  ONE OR MORE INSTRUCTIONS FOR RECEIVING A VIDEO FILE COMPRISING A PLURALITY OF FRAMES;
  ONE OR MORE INSTRUCTIONS FOR EXTRACTING GLOBAL MOTION VECTORS FROM THE PLURALITY OF FRAMES;
  ONE OR MORE INSTRUCTIONS FOR DETECTING CORNER POINTS IN THE PLURALITY OF FRAMES;
  ONE OR MORE INSTRUCTIONS FOR EXTRACTING LOCAL MOTION VECTORS BASED ON THE GLOBAL MOTION VECTORS;
  ONE OR MORE INSTRUCTIONS FOR DIVIDING THE VIDEO FILE INTO A PLURALITY OF SLIDING WINDOWS, EACH OF THE PLURALITY OF SLIDING WINDOWS COMPRISING AT LEAST TWO OF THE PLURALITY OF FRAMES;
    FOR EACH OF THE PLURALITY OF SLIDING WINDOWS, AT LEAST ONE OF
      ONE OR MORE INSTRUCTIONS FOR GENERATING MOTION FLOWS BASED ON THE LOCAL MOTION VECTORS AND THE CORNER POINTS,
      ONE OR MORE INSTRUCTIONS FOR CLUSTERING THE MOTION FLOWS HAVING SIMILAR CHARACTERISTICS INTO A FIRST PLURALITY OF CLUSTERS,
      ONE OR MORE INSTRUCTIONS FOR EXTRACTING FIRST MEANINGFUL CLUSTERS FROM THE FIRST PLURALITY OF CLUSTERS, OR
      ONE OR MORE INSTRUCTIONS FOR MATCHING THE MOTION FLOWS IN THE FIRST MEANINGFUL CLUSTERS OF A CURRENT SLIDING WINDOW OF THE PLURALITY OF SLIDING WINDOWS WITH THE MOTION FLOWS IN THE FIRST MEANINGFUL CLUSTERS OF PREVIOUS SLIDING WINDOWS OF THE PLURALITY OF SLIDING WINDOWS;
  CLUSTERING THE INTERESTING MOTION FLOWS HAVING THE SIMILAR CHARACTERISTICS INTO A SECOND PLURALITY OF CLUSTERS;
  EXTRACTING SECOND MEANINGFUL CLUSTERS FROM THE SECOND PLURALITY OF CLUSTERS; OR
  MERGING THE MOTION FLOWS IN THE SECOND MEANINGFUL CLUSTERS TO GENERATE REPRESENTATIVE MOTION FLOWS.

*Fig. 7B*

704B AT LEAST ONE OF
    ONE OR MORE INSTRUCTIONS FOR RECEIVING A QUERY VIDEO FILE;
    ONE OR MORE INSTRUCTIONS FOR EXTRACTING A REPRESENTATIVE MOTION FLOW FROM THE QUERY VIDEO FILE;
    ONE OR MORE INSTRUCTIONS FOR DIVIDING THE REPRESENTATIVE MOTION FLOW INTO A PLURALITY OF SEGMENTS;
    ONE OR MORE INSTRUCTIONS FOR MAPPING A SET OF SYMBOLS TO EACH OF THE PLURALITY OF SEGMENTS TO GENERATE A QUERY SYMBOLIC REPRESENTATION OF THE REPRESENTATIVE MOTION FLOW, WHEREIN EACH SYMBOL IN THE SET OF SYMBOLS REPRESENTS A DIRECTION OF THE CORRESPONDING SEGMENT, AND WHEREIN A NUMBER OF SYMBOLS IN THE SET OF SYMBOLS REPRESENTS A LENGTH OF THE SEGMENT; OR
    ONE OR MORE INSTRUCTIONS FOR RETRIEVING CANDIDATE MOTION FLOWS HAVING CANDIDATE SYMBOLIC REPRESENTATIONS THAT ARE SIMILAR TO THE QUERY SYMBOLIC REPRESENTATION

*Fig. 7C*

REPRESENTATIVE MOTION FLOW EXTRACTION FOR EFFECTIVE VIDEO CLASSIFICATION AND RETRIEVAL

BACKGROUND

Unless otherwise indicated herein, the materials described in this section are not prior art to the claims in this application and are not admitted to be prior art by inclusion in this section.

Some content-based video retrieval ("CBVR") systems can extract content features from video in order to characterize the video. When a user submits a query containing desired features, the CBVR systems can retrieve relevant videos having extracted content features that match the user-submitted desired features. These extracted content features may include low-level static features that are extracted from one or more frames in the video. Some examples of low-level static features may include colors, textures, and shapes of objects within the video. In addition to the low-level static features, the extracted content features may also include motion features, which describe the movement of objects within the video. However, conventional approaches for extracting motion features may not be effective or efficient for video retrieval applications.

SUMMARY

The present disclosure generally describes a computer-implemented method for extracting a representative motion flow from video. According to some example methods, a computing device having a processor and a memory may be configured to perform one or more of the following operations. The computing device is configured to receive a video file including a multiple number of frames. The computing device is configured to divide the video file into a multiple number of sliding windows. Each of the sliding windows may include at least two frames. For each of the sliding windows, the computing device is configured to generate motion flows, cluster the motion flows having similar characteristics into a first multiple number of clusters, extract first meaningful clusters from the first multiple number of clusters, and match the motion flows in the first meaningful clusters of a current sliding window of the multiple number of sliding windows with the motion flows in the first meaningful clusters of previous sliding windows of the multiple number of sliding windows to generate interesting motion flows. The computing device is configured to determine representative motion flows based on the interesting motion flows.

The present disclosure generally describes some computer storage media. Some example computer storage media may include computer-executable instructions stored thereon for a method which, when executed by a computer, adapt the computer to extract a representative motion flow from video. According to some example methods, the computer may be configured to perform one or more of the following operations. The computer is configured to receive a video file including a multiple number of frames. The computer is configured to extract global motion vectors from the multiple number of frames. The computer is configured to detect corner points in the multiple number of frames. The computer is configured to extract local motion vectors based on the global motion vectors. The computer is configured to divide the video file into a multiple number of sliding windows. Each of the sliding windows may include at least two of the multiple number of frames. For each of the sliding windows, the computer is configured to generate motion flows based on the local motion vectors and the corner points, cluster the motion flows having similar characteristics into a first multiple number of clusters, extract first meaningful clusters from the first multiple number of clusters, and match the motion flows in the first meaningful clusters of a current sliding window of the multiple number of sliding windows with the motion flows in the first meaningful clusters of previous sliding windows of the multiple number of sliding windows to generate interesting motion flows. The computer is configured to cluster the interesting motion flows having the similar characteristics into a second multiple number of clusters. The computer is configured to extract second meaningful clusters from the second multiple number of clusters. The computer is configured to merge the motion flows in the second meaningful clusters to generate representative motion flows.

The present disclosure generally describes some computer systems configured to retrieve a video. Some example computer systems may be configured to include a processor, a memory coupled to the processor, and a video retrieval application. The video retrieval application may be adapted to execute in the processor from the memory and, when executed by the processor, cause the computer system to retrieve the video by performing one or more of the following operations. The computer system is configured to receive a query video file. The computer system is configured to extract a representative motion flow from the query video file. The computer system is configured to divide the representative motion flow into a multiple number of segments. The computer system is configured to map a set of symbols to each of the multiple number of segments to generate a query symbolic representation of the representative motion flow. Each symbol in the set of symbols may represent a direction of the corresponding segment. A number of symbols in the set of symbols may represent a length of the segment. The computer system is configured to retrieve candidate video files with corresponding candidate motion flows having candidate symbolic representations that are similar to the query symbolic representation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIGS. 7A-7C are schematic diagrams illustrating a computer program product, all arranged according to at least some embodiments presented.

DETAILED DESCRIPTION

Figure 1:
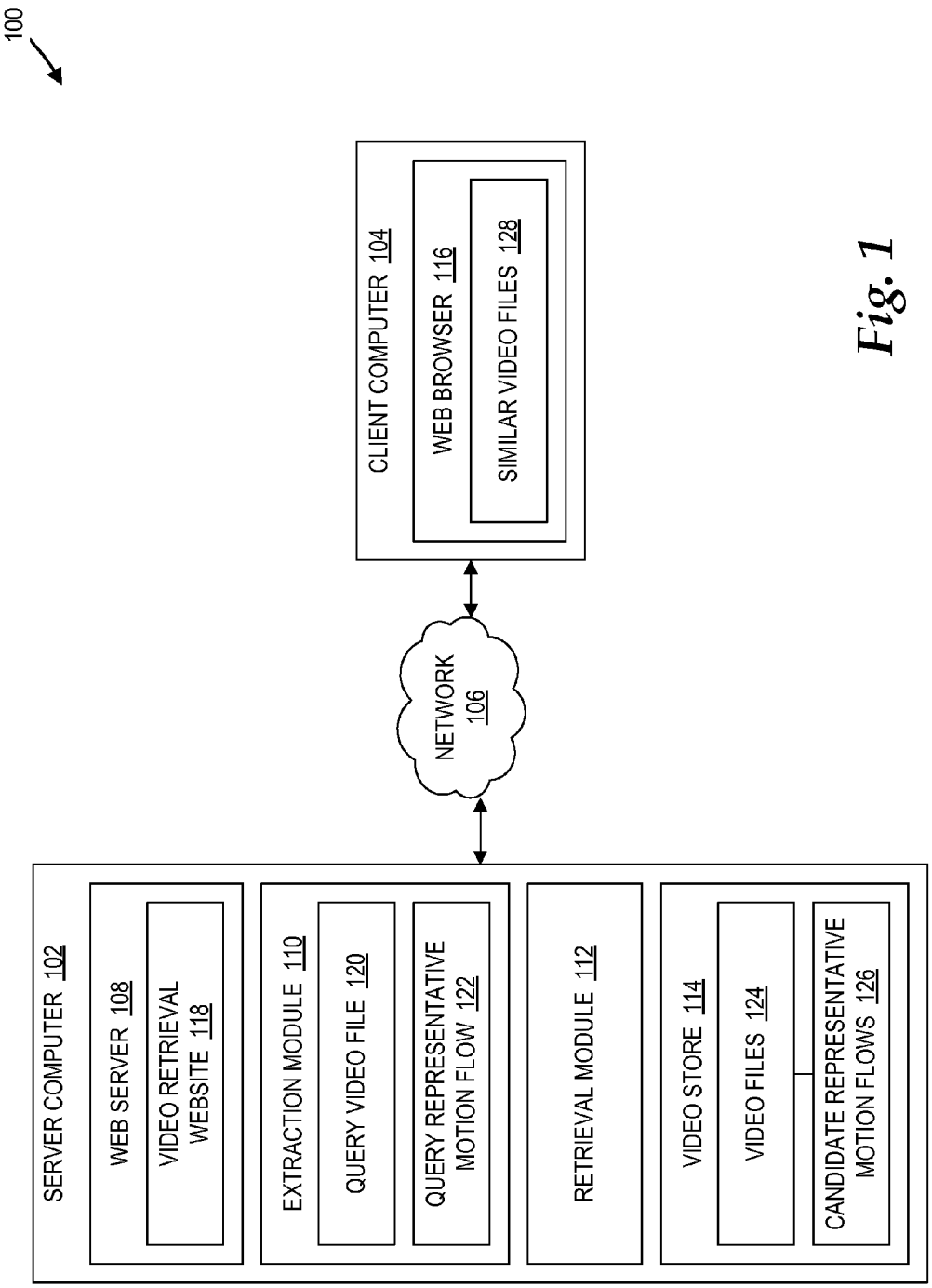
FIG. 1 is a functional block diagram illustrating an example operating environment for extracting representative motion flows from videos and retrieving videos having similar motion flows.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to video classification processes and a video retrieval processes. In an illustrative implementation, a video search application may execute the video classification process to extract one or more representative motion flows from a video. Each representative motion flow may accurately illustrate the motion of an object through multiple frames of the video. The video search application may execute the video classification process to classify candidate videos in a video store according to the corresponding representative motion flows.

The video search application may be configured to receive a query containing a query video. The video search application may further execute the video classification process to extract one or more representative motion flows from the query video. The video search application may then execute the video retrieval process to retrieve any candidate videos from the video store having representative motion flows that are similar to the query video. The video search application may return the similar candidate videos in response to the query.

Turning now to FIG. 1, a functional block diagram illustrates an example operating environment 100 for extracting representative motion flows from videos and retrieving videos having similar motion flows, in accordance with at least some embodiments presented herein. The operating environment 100 may include a server computer 102 and a client computer 104. The server computer 102 and the client computer 104 may be coupled via a network 106, such as a local area network ("LAN"), a wide area network ("WAN"), the Internet, or the like. The server computer 102 may include a web server 108, an extraction module 110, a retrieval module 112, and a video store 114. The client computer 104 may include a web browser 116.

The web server 108 may be configured to provide a video retrieval website 118. A user or a non-human process may access the video retrieval website 118 by utilizing the web browser 116 on the client computer 104. The video retrieval website 118 may be configured with a query submission interface (not shown), whereby the user can submit a query video file 120. When the server computer 102 receives the query video file 120, the extraction module 110 may be configured to extract at least one query representative motion flow 122 based on the query video file 120. The query representative motion flow 122 may depict a trajectory of one or more objects through the sequential frames within the query video file 120.

When the extraction module 110 extracts the query representative motion flow 122, the retrieval module 112 may be configured to retrieve other video files having similar representative motion flows. The video store 114 may be configured to store video files 124 and corresponding candidate representative motion flows 126. Each of the video files 124 may correspond to one or more of the candidate representative motion flows 126. The extraction module 110 may have previously extracted the candidate representative motion flows 126 based on the video files 124.

The retrieval module 112 may be configured to retrieve similar video files 128 having the candidate representative motion flows 126 that are similar to the query representative motion flow 122. The retrieval module 112 may then return the similar video files 128 or hyperlinks ("links") to the similar video files 128 to the user through the video retrieval website 118. The video retrieval website 118 may display the similar video files 128 in any suitable format and/or layout. For example, the video retrieval website 118 may display the similar video files 128 in a search engine results page ("SERP") containing a ranked list of the links to the similar video files 128 and short captions described each of the similar video files 128.

Figure 2A:
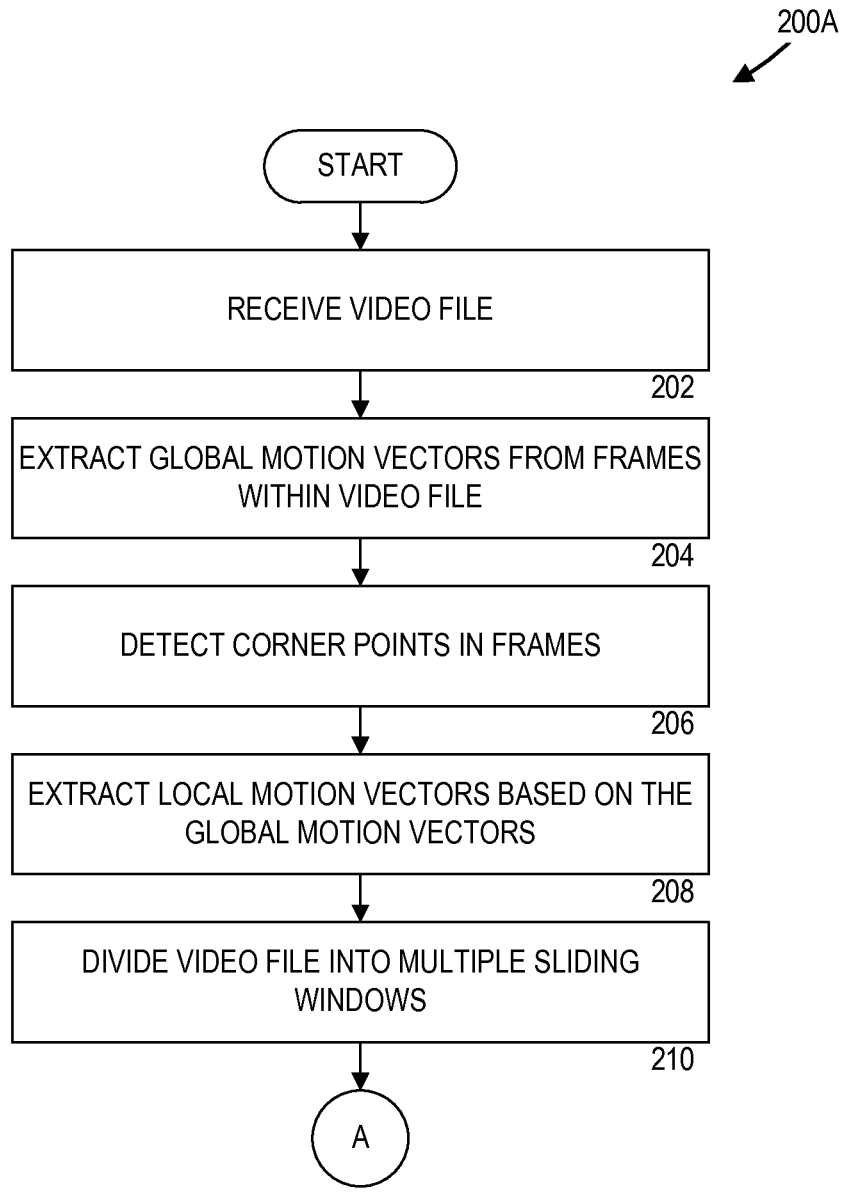
FIGS. 2A and 2B are flow diagrams illustrating an example process for extracting a representative motion flow from a video.
Figure 2B:
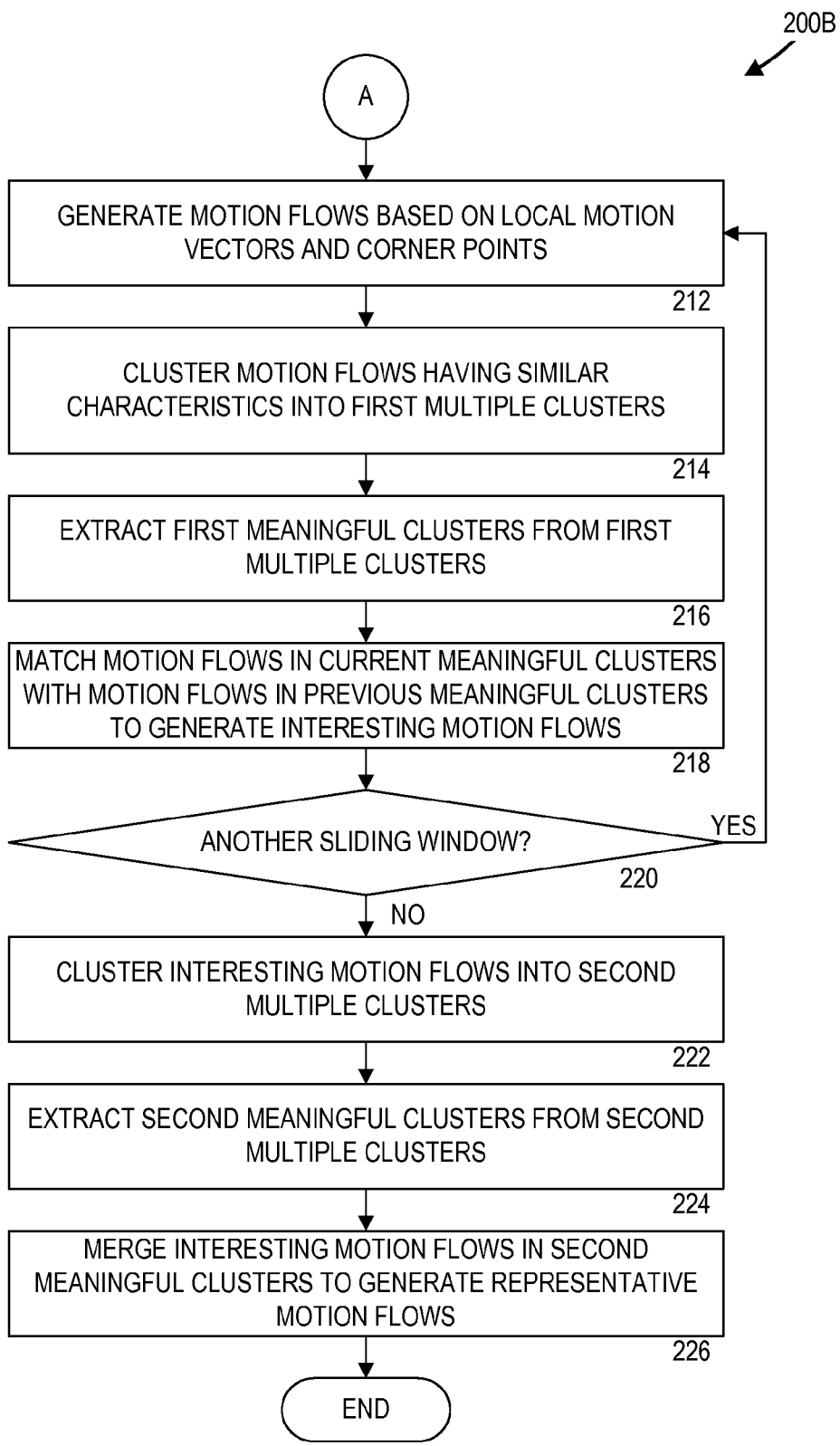

Turning now to FIGS. 2A-2B, flow diagrams illustrate an example process 200A-200B for extracting a representative motion flow from a video, in accordance with at least some embodiments described herein. In some embodiments, the extraction module 110 may utilize the process 200A-200B to extract the query representative motion flow 122 based on the query video file 120. In some other embodiments, the extraction module 110 may utilize the process 200A-200B to extract the candidate representative motion flows 126 based on the video files 124.

The process 200A-200B may include various operations, functions, or actions as illustrated by one or more of blocks 202-226. The process 200A-200B may begin at block 202 (Receive Video File), where a program module, such as the extraction module 110 and/or the retrieval module 112, may be configured to receive a video file, such as the query video file 120 and/or the video files 124. The video file may include multiple frames. A video rendering application (not shown) may be configured to display a video by rendering the frames in a given sequence. The video file may also include different types of frames, depending on the particular encoding and/or compression methods that are utilized. For example, a Moving Picture Experts Group ("MPEG") video file may include I-frames, P-frames, and/or B-frames. The video file may be embodied in any appropriate video coding technology including MPEG, Audio Video Interleave ("AVI"), QUICKTIME file format, REALMEDIA file format, or other suitable video coding technologies adapted to generate video. Block 202 may be followed by block 204.

At block 204 (Extract Global Motion Vectors), the program module may be configured to extract global motion vectors from the frames within the video file. The global motion vectors may specify a direction and distance in which objects within the frames are moved from one frame to another frame. One or more of the frames within the video file may contain the global motion vectors. In an illustrative example, an MPEG video file may contain B-frames, P-frames, and/or I-frames. An I-frame may be configured to fully specify an image. The I-frame may contain full image information regarding the color, shape, size, position, orientation, and/or other suitable information regarding various objects within a given frame. In order to reduce the size of the video file, a P-frame may be configured to utilize data from previous frames, and a B-frame may be configured to utilize data from previous and forward frames.

Continuing the example, an I-frame and a P-frame may be two consecutive frames in the video file. The I-frame may contain image information showing a car positioned on a background. In the video file, the car may move from a first position in the I-frame to a second position in the P-frame, while the background remains steady and the car remains the same shape, size, and color. In this case, the P-frame may simply contain one or more vectors showing movement of the car from the first position to the second position. Since the shape, size, and color of the car remain the same and the background remains steady, a video rendering application can utilize much of the image information from the I-frame when rendering the P-frame. Since the P-frame does not repeat the similar image information contained in the I-frame, the size of the video file can be significantly reduced.

The program module may be configured to extract these vectors (referred to herein as global motion vectors) from the B-frames and the P-frames. Some other video coding technologies may also contain vectors indicating the movement of objects across multiple images. Even if the video coding technology does not natively contain vectors, the program module may be configured to obtain motion vectors through an optical flow extraction technique or other suitable technologies adapted to extract motion vectors from video files. Block 204 may be followed by block 206.

At block 206 (Detect Corner Points), the program module may be configured to detect corner points in the frames. A corner point may be defined as a point where at least two non-parallel edges meet. The corner points may identify various objects within the frames. In some embodiments, the program module may be configured to utilize the Harris corner detection technique in order to detect the corner points. In some other embodiments, the program module may be configured to utilize other suitable techniques adapted to detect corner points within the frames.

The Harris corner detection technique may represent an example of a local interest point ("LIP") or key point detection technique. In addition to the Harris corner detection technique, other techniques for detecting and tracking LIPs or key points include a scale-invariant feature transform ("SIFT") technique. The SIFT technique may be adapted to detect key points that contain an invariant feature in scale space. The SIFT technique may be further adapted to describe the key points using the invariant feature (also referred to as a "SIFT feature"). The SIFT technique may be implemented in image processing operations. However, the SIFT technique may be more complicated and time-consuming than the Harris corner point technique. Block 206 may be followed by block 208.

At block 208 (Extract Local Motion Vectors), the program module may be configured extract local motion vectors based on the global motion vectors. When a user records a moving object through a video camera, the user may accordingly adjust the position of the video camera such that the moving object is consistently at or near the center of the recorded frames. For example, a user may utilize a video camera to record an athlete running a sprint on a track. The user may adjust the position of the video camera to follow the athlete as the athlete runs along the track. In this case, since the video camera follows the athlete, the corresponding global motion vectors may indicate the movement of background objects (e.g., the track) rather than the intended object (e.g., the athlete). However, if the user places the video camera on a tripod or some other device holding the video camera in a fixed position, then the background objects may remain constant while the intended object moves across the frames. If the video camera does not move, then the global motion vectors may properly indicate the movement of the intended object.

In some embodiments, the program module may be configured to detect the camera motion by utilizing a support vector machine ("SVM") trained with a four-parameter estimation model. In some other embodiments, the program module may be configured to detect the camera motion utilizing other suitable techniques, including the first, second, and third additional techniques described below, adapted to detect the presence of camera motion in the global motion vectors. If the program module detects camera motion, then the program module may be configured to compensate for the camera motion in the global motion vectors in order to generate the local motion vectors. If the program module does not detect any camera motion, then the program module may utilize the global motion vectors as the local motion vectors.

In the first additional technique, the program module may be configured to detect camera motion based on the number of the corner points in each frame. The program module may be configured to determine whether the number of the corner points in each frame significantly decreases (e.g., decreases by an amount greater than a threshold) in one or more of the frames. If the program module determines that the number of corner points in each frame significantly decreases in one or more of the frames, then the program module may be configured to determine that the global motion vectors contain camera motion. If the program module determines that the number of the corner points in each frame does not significantly decrease in one or more of the frames, then the program module may be configured to determine that the global motion vectors do not contain camera motion. For example, the number of corner points may decrease between frames during camera motion because the camera motion may cause distortion (e.g., blur) in one or more of the frames before the video camera can focus. The program module may detect fewer corner points in these distorted frames as compared to the more focused frames (i.e., non-distorted frames).

In the second additional technique, the program module may be configured to detect camera motion based on the number of the corner points corresponding to the global motion vectors. The program module may be configured to determine whether the number of the corner points corresponding to the global motion vectors exceeds a threshold. If the program module determines that the number of the corner points corresponding to the global motion vectors exceeds the threshold, then the program module may be configured to determine that the global motion vectors contain camera motion. If the program module determines that the number of the corner points corresponding to the global motion vectors does not exceed the threshold, then the program module may be configured to determine that the global motion vectors do not contain camera motion. For example, a high number of corner points corresponding to the global motion vectors may indicate movement in background objects rather than the intended object. When no camera motion is present, then the background objects may remain steady while the intended object moves, thereby reducing the number of corner points corresponding to the global motion vectors.

In the third additional technique, the program module may be configured to detect camera motion based on a mean motion vector based on the global motion vectors. The program module may be configured to compute the mean motion vector based on the sum of the global motion vectors. The program module may be configured to determine whether the mean motion vector exceeds a threshold. If the program module determines that the mean motion vector exceeds the threshold, then the program module may be configured to determine that the global motion vectors contain camera motion. If the program module determines that the mean motion vector does not exceed the threshold, then the program module may be configured to determine that the global motion vectors do not contain camera motion. For example, camera motion may create global motion vectors having multiple directions representing the camera jitter. This camera jitter may further cause the mean motion vector to be larger than when no camera motion is present. The first, second, and third additional techniques may be utilized individually, in conjunction with each other, or in conjunction with other appropriate techniques adapted to detect camera motion.

The three thresholds described above in the first, second, and third additional techniques may be determined utilizing the SVM. In an illustrative implementation, a training set for which the presence or absence of camera motion is known may be utilized. The three thresholds may be determined for each frame within the training set and normalized on a 0-1 scale by dividing the number of blocks in each frame. For each frame, the three values may be represented as a three-dimensional vector. After three-dimensional vectors have been determined for multiple frames, the three-dimensional vectors and the known results as to whether camera motion is present may be utilized to train the SVM. When the SVM has been trained, the SVM may be adapted to predict camera motion when presented with one or more of the three thresholds. The thresholds may be in the form of a high-dimensional vector based on different "kernels" of the SVM. This vector utilized to determine camera motion may represent a hyper-plain in kernel space, which could be any value based on different training set. Block 208 may be followed by block 210.

At block 210 (Divide Video File into Sliding Windows), the program module may be configured to divide the video file into multiple sliding windows. Each sliding window may contain two or more frames. In some embodiments, the sliding windows each have a fixed size containing the same number of frames. In some other embodiments, the sliding windows may have a variable size where one or more sliding windows may contain a different number of frames. Block 210 in process 200A may be followed by blocks 212-220 in process 200B. Blocks 212-220 may be performed for each successive sliding window until the sliding windows have been evaluated.

At block 212 (Generate Motion Flows), the program module may be configured to generate, for a given sliding window, motion flows based on the local vectors and the corner points. Each frame may be divided into a multiple number of equally sized blocks. For example, each frame may be divided into 3×5 blocks, 5×5 blocks, 5×7 blocks, 7×7 blocks, 8×8 blocks, or other suitable configurations. If the same blocks in adjacent frames of the sliding window have the same corner points and each block corresponds to a motion vector, then the program module may be configured match and connect the local motion vectors in the blocks in order to generate the motion flows. Block 212 may be followed by block 214.

At block 214 (Cluster Motion Flows), the program module may be configured to cluster, for the given sliding window, the motion flows having similar characteristics into first multiple clusters. The program module may be configured to normalize the motion flows into a standard, unit length. When the program module normalizes the motion flows into the unit length, the program module may be configured to apply a discrete cosine transformation ("DCT") to the motion flows. When the program module applies the DCT, the program module may be configured to extract multi-dimensional vectors from the motion flows. Each multi-dimensional vector may represent a pattern and a location for a corresponding motion flow. The program module may be configured to cluster motion flows having multi-dimensional vectors with similar patterns and/or locations into the first multiple clusters. Block 214 may be followed by block 216.

At block 216 (Extract Meaningful Clusters), the program module may be configured to extract, for the given sliding window, first meaningful clusters from the first multiple clusters. The program module may be configured to remove clusters representing noise from the first multiple clusters in order to identify the first meaningful clusters. Clusters representing noise may have a fewer number of motion flows. As a result, the program module may be configured to filter out clusters having a number of motion flows below a given threshold in order to identify the first meaningful clusters. Block 216 may be followed by block 218.

At block 218 (Match Current Meaningful Clusters with Previous Meaningful Clusters), the program module may be configured to match and connect, for the given sliding window, the motion flows in the meaningful clusters of the current sliding window with motion flows in the meaningful clusters of previous sliding windows to generate interesting motion flows. These interesting motion flows may be referred to herein as "interesting" because they may represent motion flows after clustering motion flows, extracting meaningful clusters (e.g., filtering noise), and/or matching meaningful clusters between sliding windows. The program module may be configured to match and connect the motion flows between matching clusters. The clusters may match when the corresponding motion flows have multi-dimensional vectors with similar patterns and/or locations. The interesting motion flows may be continuously augmented through the repetition of blocks 212-220 for multiple sliding windows. Block 218 may be followed by block 220.

At block 220 (Determine Whether Additional Sliding Windows Have Yet To Be Evaluated), the program module may be configured to determine whether any additional sliding windows have yet to be evaluated. If the program module determines that an additional sliding window has yet to be evaluated, then block 220 may return to block 212 in order to evaluate the additional sliding window. If the program module determines that each of the sliding windows has been evaluated, then block 220 may be followed by block 222.

At block 222 (Cluster Interesting Motion Flows), the program module may be configured to cluster the interesting motion flows having similar characteristics into second multiple clusters. The program module may be configured to cluster the interesting motion flows having multi-dimensional vectors with similar patterns and/or locations. Block 222 may be followed by block 224.

At block 224 (Extract Second Meaningful Clusters), the program module may be configured to extract second meaningful clusters from the second multiple clusters. The program module may be configured to remove clusters representing noise from the second multiple clusters to identify the second meaningful clusters. The program module may be configured to filter out clusters having a number of motion flows below a given threshold in order to identify the second meaningful clusters. The threshold in block 224 may or may not be the same as the threshold in block 216. Block 224 may be followed by block 226.

At block 226 (Merge Interesting Motion Flows to Generate Representative Motion Flows), the program module may be configured to merge the interesting motion flows in the second meaningful clusters to generate representative motion flows. The program module may be configured to merge the interesting motion flows by deleting redundant interesting motion flows to generate representative motion flows. For example, in a video file containing a recording of an athlete running a sprint, the program module may extract multiple interesting motion flows corresponding to the movement of the athlete. A first example interesting motion flow may indicate movement of the athlete's head during the sprint. A second example interesting motion flow may indicate movement of the athlete's chest during the sprint. A third example interesting motion flow may indicate movement of the athlete's feet during the sprint. Since these three interesting motion flows indicate the same movement corresponding to the same athlete, the program module may be configured to delete two of the three redundant interesting motion flows. In this case, the remaining interesting motion flow may become the representative motion flow indicating the movement of the athlete during the sprint. After block 226, the process 200A-200B may either repeat (e.g., periodically, continuously, or on demand as needed) or terminate.

Figure 3:
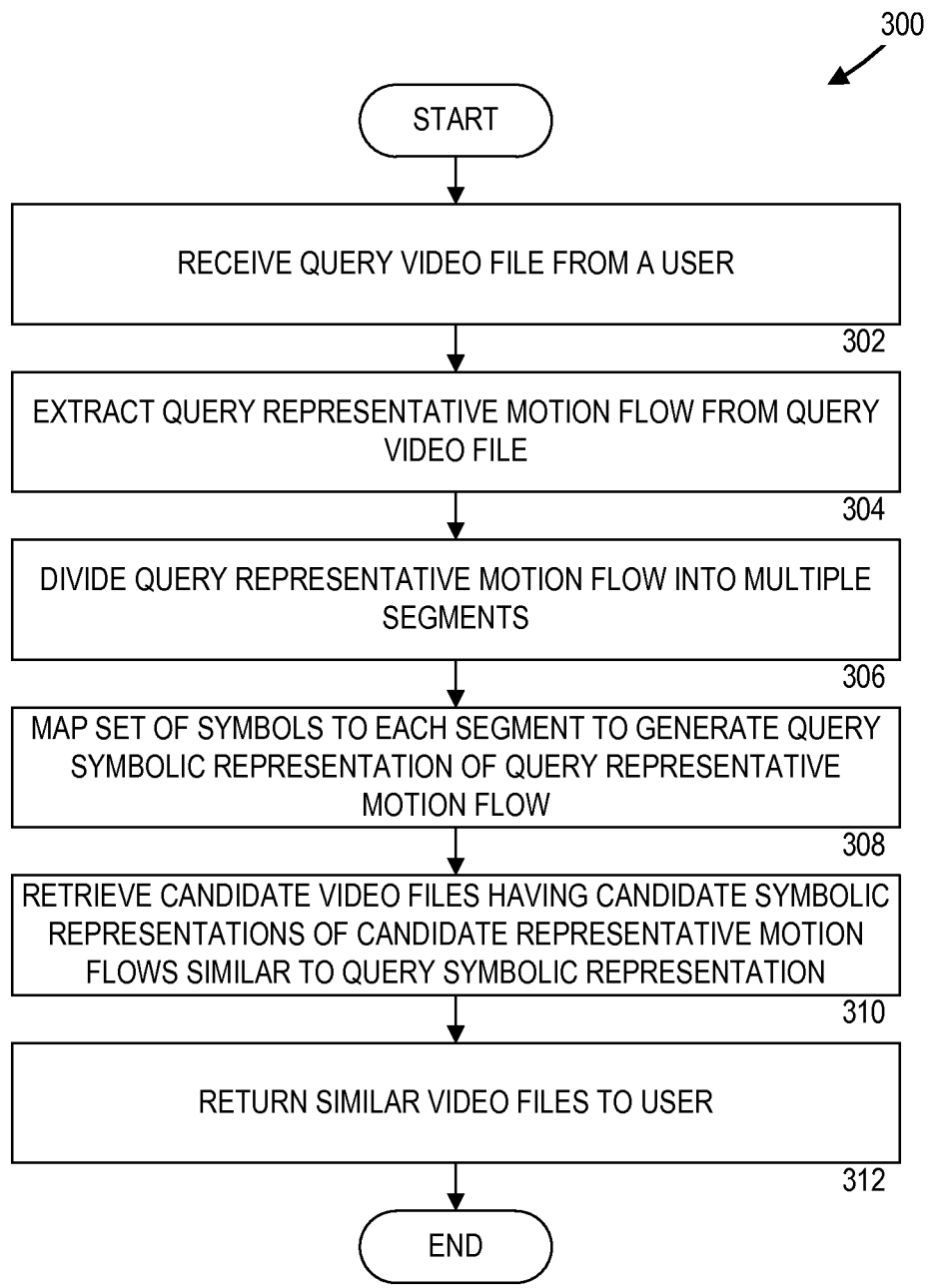
FIG. 3 is a flow diagram illustrating an example process for retrieving a video.

Turning now to FIG. 3, a flow diagram illustrates an example process 300 for retrieving a video, in accordance with at least some embodiments described herein. The process 300 may include various operations, functions, or actions as illustrated by one or more of blocks 302-312. The process 300 may begin at block 302 (Receive Query Video File), where a program module, such as the extraction module 110 and/or the retrieval module 112, may be configured to receive a video file, such as the query video file 120, from a user. For example, the user may upload the query video file 120 via the video retrieval website 118. Block 302 may be followed by block 304.

At block 304 (Extract Query Representative Motion Flow), the program module may extract a representative motion flow, such as the query representative motion flow 122, from the query video file 120. The program module may be configured to extract the query representative motion flow 122 by performing the process 200A-200B as previously described. The representative motion flow may be represented as a trajectory S. The trajectory S may be a two-dimensional time series where $S=[(t_1, s_1), (t_2, s_2), \ldots, (t_n, s_n)]$. Each pair (t, s) may represent an element of the trajectory S where t may represent a time and s may represent a vector indicating a distance and a direction of movement. Block 304 may be followed by block 306.

At block 306 (Divide Query Representing Motion Flow into Segments), the program module may be configured to divide the query representative motion flow 122 into multiple segments. The program module may be configured to divide the query representative motion flow 122 into multiple segments utilizing a bottom-up segmentation technique. Each segment may correspond to at least one of the elements of the trajectory S. Block 306 may be followed by block 308.

At block 308 (Map Set of Symbols to Each Segment to Generate Query Symbolic Representation), the program module may be configured to map a set of one or more symbols to each segment to generate a query symbolic representation of the query representative motion flow 122. As previously described, each segment may correspond to an element (t, s) where s is a vector indicating a distance and a direction of movement. Each vector in the multiple segments may map to a set of symbols. The content of the symbols in the set may indicate the direction of the movement. The number of symbols in the set may indicate the length of the movement. Some other approaches may also utilize the content of the symbols to indicate the length of the movement. However, by indicating the length of the movement through the number of symbols in the set rather than the content of the symbols, the total number of symbols (e.g., the alphabet of symbols) utilized to map to each possible permutation of the vectors can be significantly decreased. Block 308 may be followed by block 310.

At block 310 (Retrieve Video Files Having Candidate Symbolic Representations Similar to Query Symbolic Representation), the program module may be configured to retrieve video files, such as the similar video files 128, having corresponding symbolic representations that are similar the query symbolic representation. The program module may be configured to determine whether a given candidate symbolic representation is similar to the query symbolic representation according to any appropriate level of matching (e.g., complete matching, substantial matching, partial matching, etc.). The similar video files 128 may be retrieved from a database containing candidate video files, such as the video files 124. The video files 124 may correspond to representative motion flows, such as the candidate representative motion flows 126. Each of the candidate representative motion flows 126 may correspond to a candidate symbolic representation. Block 310 may be followed by block 312.

At block 312, the program module may be configured to return the similar video files 128 to the user. For example, the program module may be configured to return the similar video files 128 to the user via the video retrieval website 118. After block 312, the process 300 may either repeat (e.g., periodically, continuously, or on demand as needed) or terminate.

Figure 4D:
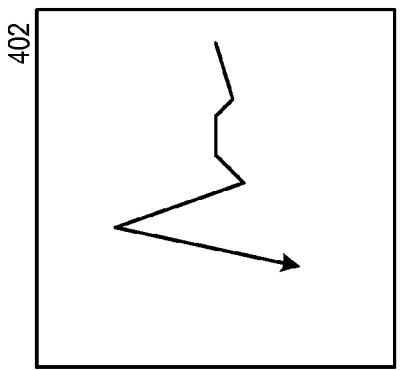
FIG. 4D shows an example representative motion flow that is extracted based on the sequence in FIGS. 4A-4C.
Figure 4C:
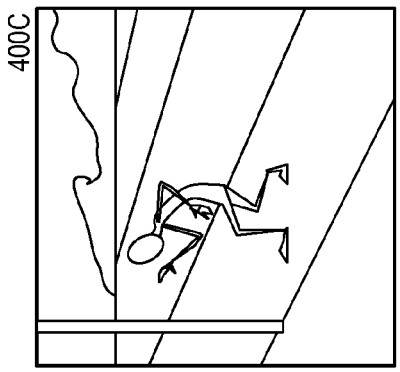
FIGS. 4A-4C show an example three-frame sequence of an illustrative video file.
Figure 4B:
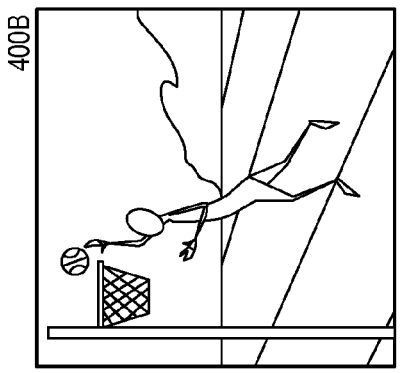
Figure 4A:
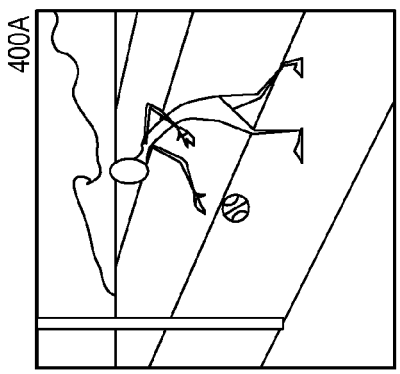
Figure 5D:
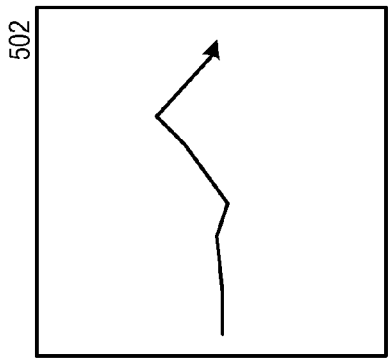
FIG. 5D shows an example representative motion flow that is extracted based on the sequence in FIGS. 5A-5C.
Figure 5C:
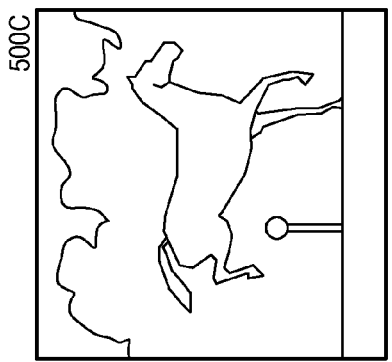
FIGS. 5A-5C show an example three-frame sequence of an illustrative video.
Figure 5B:
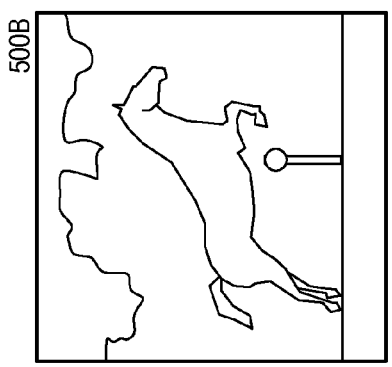
Figure 5A:
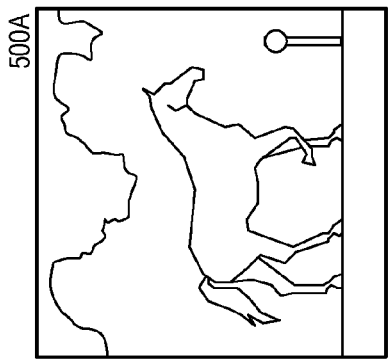

Turning now to FIGS. 4A-4D and 5A-5D, some illustrative video frames and their corresponding representative motion flows are shown. FIGS. 4A-4C show an example three-frame sequence 400A-400C of an illustrative video file in accordance with at least some embodiments described herein. FIG. 4D shows an example representative motion flow 402 that is extracted based on the sequence 400A-400C in accordance with at least some embodiments described herein. FIGS. 5A-5C show an example three-frame sequence 500A-500C of another illustrative video file in accordance with at least some embodiments described herein. FIG. 5D shows an example representative motion flow 502 that is extracted based on the sequence 500A-500C in accordance with at least some embodiments described herein.

In FIGS. 4A-4D, the first frame 400A shows an athlete dribbling a basketball towards a basketball goal. The second frame 400B shows the athlete jumping to dunk the basketball in the basketball goal. The third frame 400C shows the athlete landing after completing the dunk. The representative motion flow 402 shows the corresponding trajectory of the athlete moving towards the basketball goal, jumping up, and then coming back down.

In FIGS. 5A-5D, the first frame 500A shows a horse approaching an obstacle. The second frame 500B shows the horse initiating a jump over the obstacle. The third frame 500C shows the horse finishing the jump over the obstacle. The representative motion flow 502 shows the corresponding trajectory of the horse moving towards the obstacle, initiating the jump over the obstacle, and finishing the jump over the obstacle.

Figure 6:
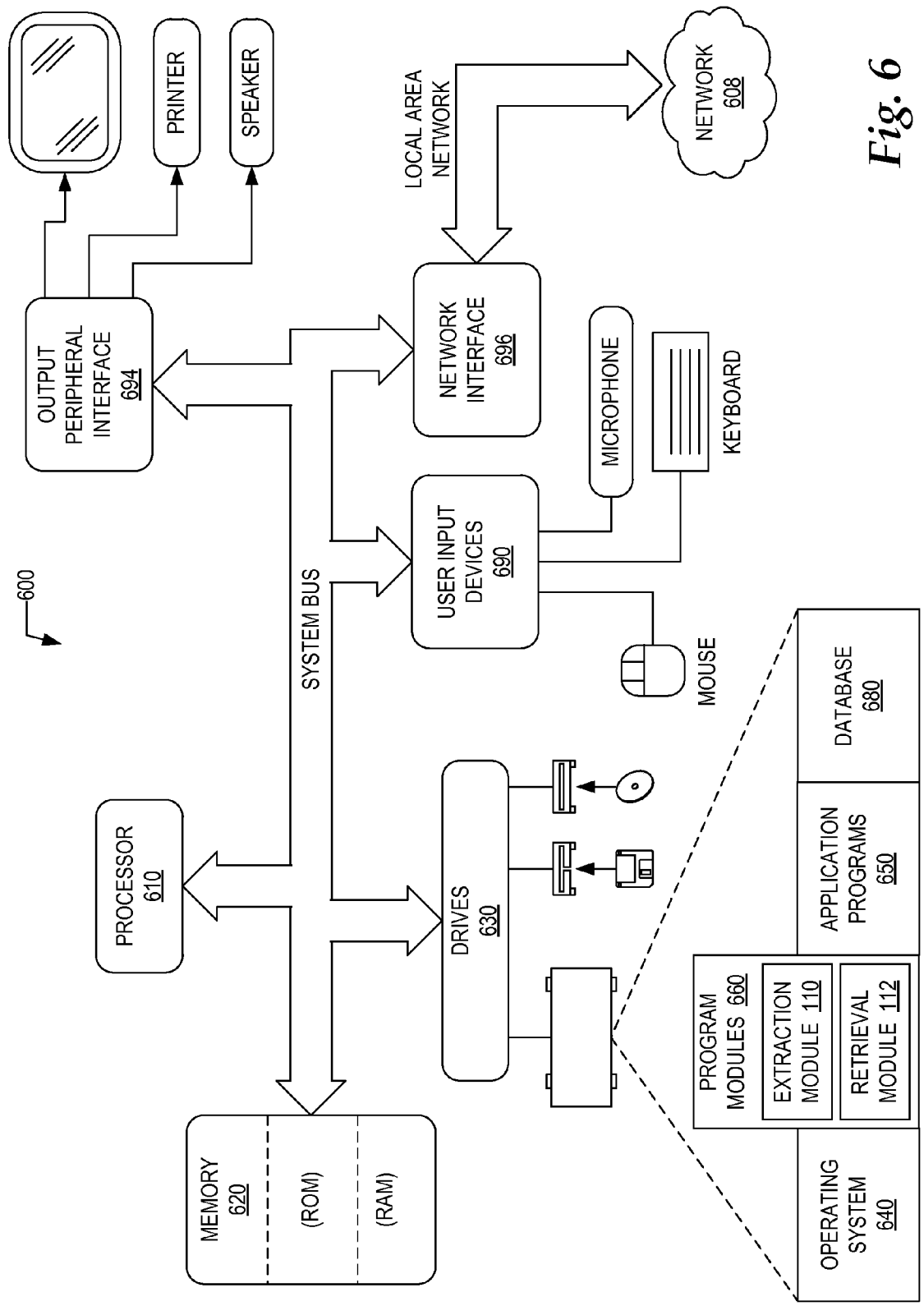
FIG. 6 is a block diagram illustrating an example computing system.

FIG. 6 is a computer architecture diagram showing an illustrative computer hardware architecture for an example computing system capable of implementing at least some embodiments presented herein. FIG. 6 includes a computer 600, including a processor 610, memory 620 and one or more drives 630. The computer 600 may be implemented as a conventional computer system, an embedded control computer, a laptop, or a server computer, a mobile device, a set-top box, a kiosk, a vehicular information system, a mobile telephone, a customized machine, or other hardware platform.

The drives 630 and their associated computer storage media, provide storage of computer readable instructions, data structures, program modules and other data for the computer 600. The drives 630 can include an operating system 640, application programs 650, program modules 660, and a database 680. The program modules 660 may include the extraction module 110 and/or the retrieval module 112. The extraction module 110 and/or the retrieval module 112 may be adapted to execute the process 200A-200B for extracting a representative motion flow from video as described in greater detail above with reference to FIGS. 2A-2B. Further, the extraction module 110 and/or the retrieval module 112 may be adapted to execute the process 300 for retrieving a video as described in greater detail above with reference to FIG. 3. The computer 600 further includes user input devices 690 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 610 through a user input interface that is coupled to a system bus, but may be coupled by other interface and bus structures, such as a parallel port, game port or a universal serial bus ("USB"). Computers such as the computer 600 may also include other peripheral output devices such as speakers, which may be coupled through an output peripheral interface 694 or the like.

The computer 600 may operate in a networked environment using logical connections to one or more computers, such as a remote computer coupled to a network interface 696. The remote computer may be a personal computer, a server, a router, a network PC, a peer device or other common network node, and can include many or all of the elements described above relative to the computer 600. Networking environments are commonplace in offices, enterprise-wide area networks ("WAN"), local area networks ("LAN"), intranets, and the Internet.

When used in a LAN or WLAN networking environment, the computer 600 may be coupled to the LAN through the network interface 696 or an adapter. When used in a WAN networking environment, the computer 600 typically includes a modem or other means for establishing communications over the WAN, such as the Internet or the network 608. The WAN may include the Internet, the illustrated network 608, various other networks, or any combination thereof. It will be appreciated that other mechanisms of establishing a communications link, ring, mesh, bus, cloud, or network between the computers may be used.

According to some embodiments, the computer 600 may be coupled to a networking environment. The computer 600 may include one or more instances of a physical computer-readable storage medium or media associated with the drives 630 or other storage devices. The system bus may enable the processor 610 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 620, whether characterized as RAM, ROM, flash, or other types of volatile or nonvolatile memory technology. The media may also represent secondary storage, whether implemented as the storage drives 630 or otherwise. Hard drive implementations may be characterized as solid state, or may include rotating media storing magnetically-encoded information.

The storage media may include one or more program modules 660. The program modules 660 may include software instructions that, when loaded into the processor 610 and executed, transform a general-purpose computing system into a special-purpose computing system. As detailed throughout this description, the program modules 660 may provide various tools or techniques by which the computer 600 may participate within the overall systems or operating environments using the components, logic flows, and/or data structures discussed herein.

The processor 610 may be constructed from any number of transistors or other circuit elements, which may individually or collectively assume any number of states. More specifically, the processor 610 may operate as a state machine or finite-state machine. Such a machine may be transformed to a second machine, or specific machine by loading executable instructions contained within the program modules 660. These computer-executable instructions may transform the processor 610 by specifying how the processor 610 transitions between states, thereby transforming the transistors or other circuit elements constituting the processor 610 from a first machine to a second machine. The states of either machine may also be transformed by receiving input from the one or more user input devices 690, the network interface 696, other peripherals, other interfaces, or one or more users or other actors. Either machine may also transform states, or various physical characteristics of various output devices such as printers, speakers, video displays, or otherwise.

Encoding the program modules 660 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 660 may transform the physical state of the semiconductor memory 620 when the software is encoded therein. For example, the software may transform the state of transistors, capacitors, or other discrete circuit elements constituting the semiconductor memory 620.

As another example, the storage media may be implemented using magnetic or optical technology such as drives 630. In such implementations, the program modules 660 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 7A:
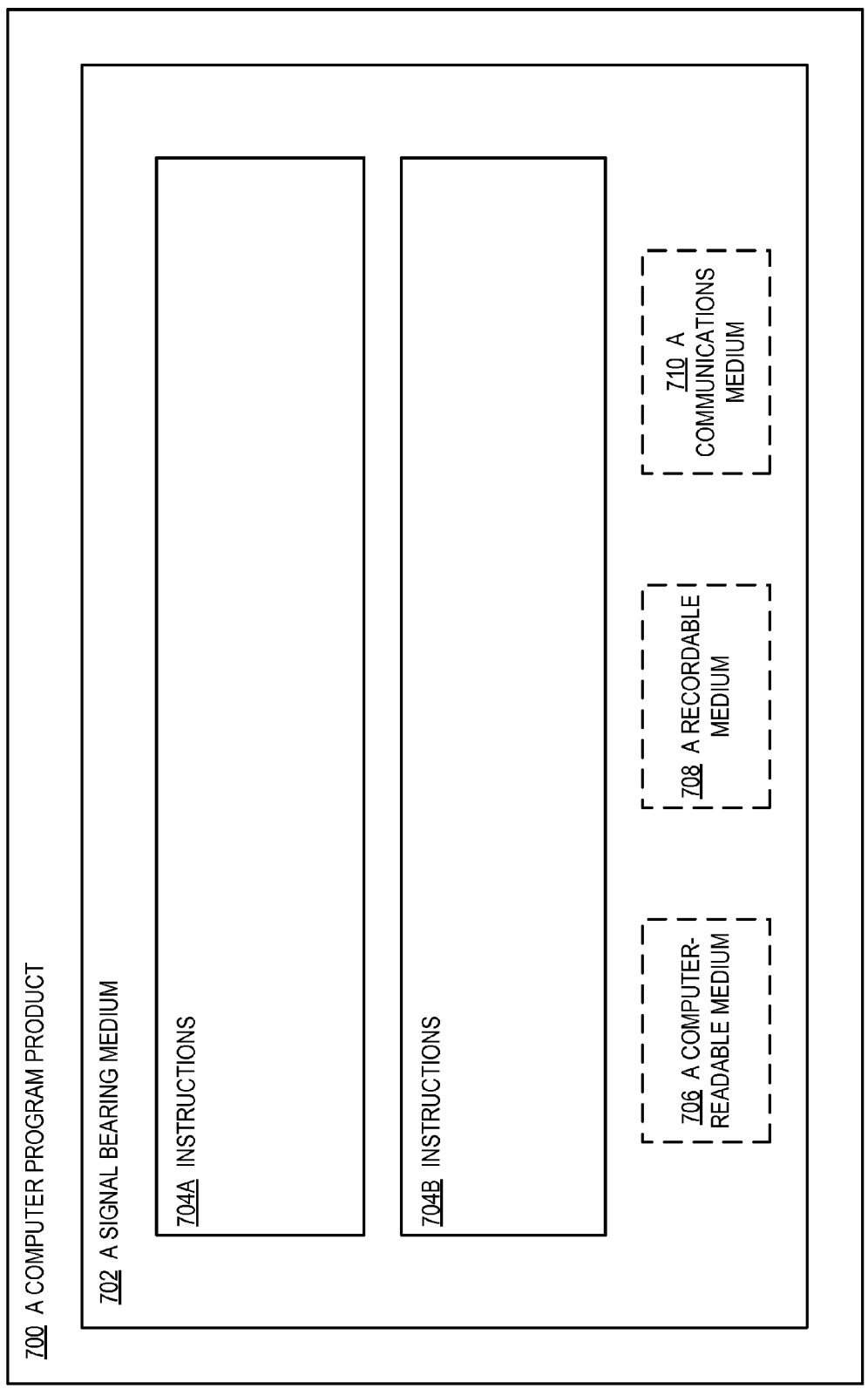

Turning now to FIGS. 7A-7C, schematic diagrams illustrate a partial view of a computer program product 700 that includes a computer program for executing a computer process on a computing device, arranged according to at least some embodiments presented herein. An illustrative embodiment of the example computer program product 700 is provided using a signal bearing medium 702, may include at least one instruction of 704A and/or at least one instruction of 704B. The instructions 704A as illustrated in FIG. 7B may include: one or more instructions for receiving a video file comprising a plurality of frames; one or more instructions for extracting global motion vectors from the plurality of frames; one or more instructions for detecting corner points in the plurality of frames; one or more instructions for extracting local motion vectors based on the global motion vectors; one or more instructions for dividing the video file into a plurality of sliding windows, each of the plurality of sliding windows comprising at least two of the plurality of frames; for each of the plurality of sliding windows, one or more instructions for generating motion flows based on the local motion vectors and the corner points, one or more instructions for clustering the motion flows having similar characteristics into a first plurality of clusters, one or more instructions for extracting first meaningful clusters from the first plurality of clusters, or one or more instructions for matching the motion flows in the first meaningful clusters of a current sliding window of the plurality of sliding windows with the motion flows in the first meaningful clusters of previous sliding windows of the plurality of sliding windows to generate interesting motion flows; one or more instructions for clustering the interesting motion flows having the similar characteristics into a second plurality of clusters; one or more instructions for extracting second meaningful clusters from the second plurality of clusters; or one or more instructions for merging the motion flows in the second meaningful clusters to generate representative motion flows.

The instructions 704B as illustrated in FIG. 7C may include: one or more instructions for receiving a query video file; one or more instructions for extracting a representative motion flow from the query video file; one or more instructions for dividing the representative motion flow into a plurality of segments; one or more instructions for mapping a set of symbols to each of the plurality of segments to generate a query symbolic representation of the representative motion flow, wherein each symbol in the set of symbols represents a direction of the corresponding segment, and wherein a number of symbols in the set of symbols represents a length of the segment; or one or more instructions for retrieving candidate video files with corresponding candidate motion flows having candidate symbolic representations that are similar to the query symbolic representation. The one or more instructions may be, for example, computer executable and/or logic implemented instructions. In some embodiments, the signal bearing medium 702 of the one or more computer program products 700 include a computer readable medium 706, a recordable medium 708, and/or a communications medium 710.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method to extract a representative motion flow from video, the method comprising:
   receiving, through a computer having a processor and a memory, a video file comprising a plurality of frames;
   detecting, through the computer, corner points that exist in the plurality of frames by performing one or more image processing operations on the plurality of frames;
   dividing, through the computer, the video file into a plurality of sliding windows, each of the plurality of sliding windows comprising at least two of the plurality of frames;
   for each of the plurality of sliding windows,
      generating, through the computer, motion flows based at least in part on the corner points,
      clustering, through the computer, the motion flows having similar characteristics into a first plurality of clusters,
      extracting, through the computer, first meaningful clusters from the first plurality of clusters, and
      matching, through the computer, the motion flows in the first meaningful clusters of a current sliding window of the plurality of sliding windows with the motion flows in the first meaningful clusters of previous sliding windows of the plurality of sliding windows to generate interesting motion flows,
   detecting, through the computer, camera motion based at least in part on a change in a number of the corner points between at least two of the plurality of frames; and
   determining, through the computer, representative motion flows based on the interesting motion flows.

2. The computer-implemented method of claim 1 further comprising:
   extracting, through the computer, global motion vectors from the plurality of frames; and
   extracting, through the computer, local motion vectors based on the global motion vectors.

3. The computer-implemented method of claim 2, wherein generating motion flows comprises generating, through the computer, the motion flows based on the local motion vectors and the corner points.

4. The computer-implemented method of claim 3, wherein each of the plurality of frames comprises a plurality of blocks; wherein each of the local motion vectors corresponds to one of the plurality of blocks; and wherein generating motion flows based on the local motion vectors and the corner points comprises matching, through the computer, the local motion vectors in the blocks that contain the same corner points in adjacent frames of the plurality of frames.

5. The computer-implemented method of claim 2, wherein the video file comprises a Moving Picture Experts Group (MPEG)-standard video file; wherein the plurality of frames comprises B-frames and P-frames; and wherein extracting global motion vectors from the plurality of frames comprises extracting, through the computer, the global motion vectors from the B-frames and the P-frames in the MPEG-standard video file.

6. The computer-implemented method of claim 2, wherein extracting global motion vectors from the plurality of frames comprises extracting, through the computer, the global motion vectors from the video file utilizing an optical flow extraction technique.

7. The computer-implemented method of claim 2, wherein detecting corner points in the plurality of frames comprises detecting, through the computer, the corner points in the plurality of frames utilizing a Harris corner detection technique.

8. The computer-implemented method of claim 2, wherein extracting local motion vectors based on the global motion vectors comprises:
   determining, through the computer, whether the global motion vectors contain camera motion;
   in response to determining that the global motion vectors contain the camera motion, compensating, through the computer, for the camera motion in the global motion vectors to generate the local motion vectors; and
   in response to determining that the global motion vectors do not contain the camera motion, utilizing, through the computer, the global motion vectors as the local motion vectors.

9. The computer-implemented method of claim 8, wherein determining whether the global motion vectors contain camera motion comprises:
   determining, through the computer, whether the number of the corner points in each of the multiple frames decreases by an amount greater than a threshold in one or more of the multiple frames;
   in response to determining that the number of the corner points in each of the multiple frames decreases by the amount greater than the threshold in one or more of the multiple frames, determining, through the computer, that the global motion vectors contain the camera motion; and in response to determining that the number of the corner points in each of the multiple frames does not decrease by the amount greater than the threshold in one or more of the multiple frames, determining, through the computer, that the global motion vectors do not contain the camera motion.

10. The computer-implemented method of claim 8, wherein determining whether the global motion vectors contain camera motion comprises:

determining, through the computer, a number of the corner points corresponding to the global motion vectors;

determining, through the computer, whether the number of the corner points corresponding to the global motion vectors exceeds a threshold;

in response to determining that the number of the corner points corresponding to the global motion vectors exceeds the threshold, determining, through the computer, that the global motion vectors contain the camera motion; and in response to determining that the number of the corner points corresponding to the global motion vectors does not exceed the threshold, determining, through the computer, that the global motion vectors does not contain the camera motion.

11. The computer-implemented method of claim 8, wherein determining whether the global motion vectors contain camera motion comprises:

determining, through the computer, a mean motion vector based on the global motion vectors;

determining, through the computer, whether the mean motion vector exceeds a threshold;

in response to determining that the mean motion vector exceeds the threshold, determining, through the computer, that the global motion vectors contain the camera motion; and in response to determining that the mean motion vector does not exceed the threshold, determining, through the computer, that the global motion vectors do not contain the camera motion.

12. The computer-implemented method of claim 8, wherein determining whether the global motion vectors contain camera motion comprises determining, through the computer, whether the global motion vectors contain camera motion utilizing a support vector machine (SVM) trained with a four-parameter estimation model.

13. The computer-implemented method of claim 1, wherein each of the plurality of sliding windows comprises a specified number of adjacent frames of the plurality of frames.

14. The computer-implemented method of claim 1, wherein clustering the motion flows having similar characteristics into a first plurality of clusters comprises:

normalizing, through the computer, the motion flows such that the motion flows have a unit length;

upon normalizing the motion flows such that the motion flows have a unit length, applying, through the computer, a discrete cosine transform (DCT) on the motion flows;

upon applying the DCT on the motion flows, extracting, through the computer, multi-dimensional vectors from the motion flows, each of the multi-dimensional vectors representing a pattern and a location of a corresponding one of the motion flows; and clustering, through the computer, the motion flows where the corresponding multi-dimensional vectors have the similar pattern and the similar location.

15. The computer-implemented method of claim 1, wherein determining the representative motion flows based on the interesting motion flows comprises:

clustering, through the computer, the interesting motion flows having the similar characteristics into a second plurality of clusters;

extracting, through the computer, second meaningful clusters from the second plurality of clusters; and merging, through the computer, the motion flows in the second meaningful clusters to generate at least the representative motion flow.

16. The computer-implemented method of claim 15, wherein clustering the interesting motion flows having the similar characteristics into a second plurality of clusters comprises clustering, through the computer, the interesting motion flows where the corresponding multi-dimensional vectors have the similar pattern and the similar location.

17. The computer-implemented method of claim 15, wherein merging the motion flows in the second meaningful clusters to generate representative motion flows comprises deleting, through the computer, the motion flows that are redundant in the second meaningful clusters to generate the representative motion flows.

18. The computer-implemented method of claim 1, wherein extracting first meaningful clusters from the first plurality of clusters comprises filtering, through the computer, clusters representing noise from the first plurality of clusters.

19. The computer-implemented method of claim 18, wherein filtering clusters representing noise from the first plurality of clusters comprises filtering, through the computer, clusters having a size below a threshold from the plurality of clusters.

20. A non-transitory computer-readable storage medium having computer-executable instructions stored thereon which, when executed by a computer, cause the computer to:

receive a video file comprising a plurality of frames;

extract global motion vectors from the plurality of frames;

perform one or more corner detection image processing operations to detect corner points from the plurality of frames;

detect camera motion based at least in part on a change in a number of the corner points;

extract local motion vectors based on the global motion vectors;

divide the video file into a plurality of sliding windows, each of the plurality of sliding windows comprising at least two of the plurality of frames;

for each of the plurality of sliding windows, generate motion flows based on the local motion vectors and the corner points, cluster the motion flows having similar characteristics into a first plurality of clusters, extract first meaningful clusters from the first plurality of clusters, and match the motion flows in the first meaningful clusters of a current sliding window of the plurality of sliding windows with the motion flows in the first meaningful clusters of previous sliding windows of the plurality of sliding windows to generate interesting motion flows;

cluster the interesting motion flows having the similar characteristics into a second plurality of clusters;

extract second meaningful clusters from the second plurality of clusters; and merge the motion flows in the second meaningful clusters to generate representative motion flows.

* * * * *